US007748128B2

(12) United States Patent
Martin

(10) Patent No.: US 7,748,128 B2

(45) Date of Patent: Jul. 6, 2010

(54) SLAB DOCTOR LEVEL

(76) Inventor: Steven Ross Martin, P.O. Box 31467, Laughlin, NV (US) 89029

(*) Notice: Subject to any disclaimer, the term of this patent is extended or adjusted under 35 U.S.C. 154(b) by 220 days.

(21) Appl. No.: 12/075,709

(22) Filed: Mar. 12, 2008

(65) Prior Publication Data

US 2008/0229593 A1 Sep. 25, 2008

(51) Int. Cl.
*G01C 9/00* (2006.01)

(52) U.S. Cl. ............................ 33/374; 33/365; 33/383; D10/69

(58) Field of Classification Search .................. 33/347, 33/365, 370, 371, 374, 379, 381–385, 451; D10/69

See application file for complete search history.

(56) References Cited

U.S. PATENT DOCUMENTS 747,850 A * 12/1903 Bihlman ...................... 33/376
D138,392 S * 8/1944 Bernard ...................... D10/69
2,752,692 A * 7/1956 Smith .......................... 33/374
3,104,477 A * 9/1963 Edwill ......................... 33/374
4,928,395 A * 5/1990 Good .......................... 33/374
5,433,011 A * 7/1995 Scarborough et al. ......... 33/376
5,832,618 A * 11/1998 Scarborough ................ 33/451
5,881,468 A * 3/1999 Baumann ..................... 33/383
D416,818 S * 11/1999 Olson .......................... D10/69
6,543,144 B1 * 4/2003 Morin ..................... 33/27.032
6,637,120 B2 * 10/2003 Pustay ........................ 33/374
6,836,973 B1 * 1/2005 Eccles, Jr. .................... 33/374
6,918,187 B2 * 7/2005 Schaefer ...................... 33/365
7,562,463 B2 * 7/2009 Vaes ........................... 33/374
2005/0183276 A1 * 8/2005 Scarborough ................ 33/374

* cited by examiner

*Primary Examiner*—G. Bradley Bennett
*Assistant Examiner*—Tania C Courson

(57) ABSTRACT

An instrument for ascertaining whether a surface is horizontal, vertical, or at a 45* angle, consisting essentially of an encased, liquid-filled tube containing an air bubble that moves to a center window when the instrument is set on an even plane. Also called a spirit level. A box level including an elongate body, plumb and level vials, and spaced handholds having outer edges together defining first and second parallel application planes beyond first and second face planes of the elongate body.

8 Claims, 11 Drawing Sheets

14B
14A
12B
12A 25
25
25
25
40

18B
12
40
32
25
25
32
12

SLAB DOCTOR LEVEL

FIELD OF THE INVENTION

This invention relates generally to spirit levels and, more particularly, to what are referred to as box levels.

BACKGROUND OP THE INVENTION

Box levels of the type to which this invention pertains each include an elongate body which defines vial openings with horizontal & vertical vials secured therein, a pair of spaced hand-hold openings, and in many cases hang openings near the opposite ends of the body to allow the levels to be hung on pegs or other hangers for storage purposes. The elongate bodies are typically of hollow box-like configuration. Such elongate bodies, of course, further define opposed first and second face planes, as well as narrower flat edge surfaces.

Each such box level also includes a pair of hand-holds, often of plastic and/or rubber-like material, lining the two hand-hold openings and secured in such openings to the elongate body. These two hand-holds have outer edges near each of the face planes of the elongate body—ie., on either side of the elongate body. The outer edges of the two hand-holds on each side of the elongate body together define a parallel application plane just beyond the corresponding face plane. Thus, each hand-hold has first and second outer edges, and the first outer edges of the two hand-holds define an application plane just beyond the first face plane while the second outer edges of the two hand-holds define an application plane just beyond the second face plane. These hand-holds provide, on each face of the box level, an appropriate reference plane for application of the box level against work surfaces, the orientations of which are being determined. When rubber-like hand-holds are used, the level is resistant to slipping that may make surface gauging somewhat problematic.

Given the need in the construction industry for box levels in longer lengths, it has been difficult to manufacture due to transportation and storage problems. And certain box levels might be appropriate for residential use, but not for commercial and/or industrial use.

OBJECTS OF THE INVENTION

It is an object of the invention to provide an improved box level which overcomes some of the problems and shortcomings of the prior art.

Another object of the invention is to provide a sturdy box level with enhanced capability for work surface application.

Another object of the invention is to provide a box level which can be accurately held against a wide work surface of widely varying dimensions.

Another object of the invention is to provide an improved box level that will retain excellent work surface application for the life of the level, despite long use and considerable abuse.

Still another object of the invention is to provide an improved box level with excellent work surface application with respect to work surfaces of widely varying dimensions.

Another object of the invention is to provide an improved box level with the unique capability of one or more individual box level sections being coupled by means of adaptors and a locking mechanism to achieve greater length.

How these and other objects are accomplished will become apparent from the following descriptions and the drawings.

SUMMARY OF THE INVENTION

The improved box level of this invention is of the type including: an elongate body that defines vial openings, spaced hand-hold openings, opposed first and second face planes, horizontal & vertical vials secured in the vial openings; and hand-holds secured in the hand-hold openings, the hand-holds having outer edges together defining first and second parallel application planes just beyond the first and second face planes, respectively.

The improved box level of this invention allows for the coupling of individual sections (box levels) by means of the solid aluminum directional 2-way adaptor secured to each section (box level). This solid aluminum 2-way directional adaptor is machined to such tolerance so when coupled, no movement or wobbling occurs. The center section of this invention has two solid aluminum 2-way directional adaptors secured to each end of the box level, additional sections (box levels) have one solid aluminum 2-way directional adaptor secured to them. The additional sections (box levels) are coupled by simply sliding the center section (box level) into the open end of each additional section (box level). Furthermore, a locking mechanism prevents the box level sections from separating while being moved. This invention allows the user to assemble literally whatever length of level desired, and break it down for easy transportation and secure storage.

Furthermore, with the addition of the permanent, welded 90 degree angle directional 4-way adaptor, one to four sections (box levels) can be coupled to extend the level in 90 degree angles, east, west, north and south. This feature will aid floor covering installers, for example, not only to check slope, grade, etc. in large rooms or areas, but also can aid in layout as well.

This improved box level also is manufactured from ⅛ inch thick extruded aluminum tube, and is powder coated for durability. With these significant design changes this very improved box level overcomes certain problems and shortcomings of the prior art, including those described above.

DETAILED DESCRIPTION OF PREFERRED EMBODIMENT

Figure 1:
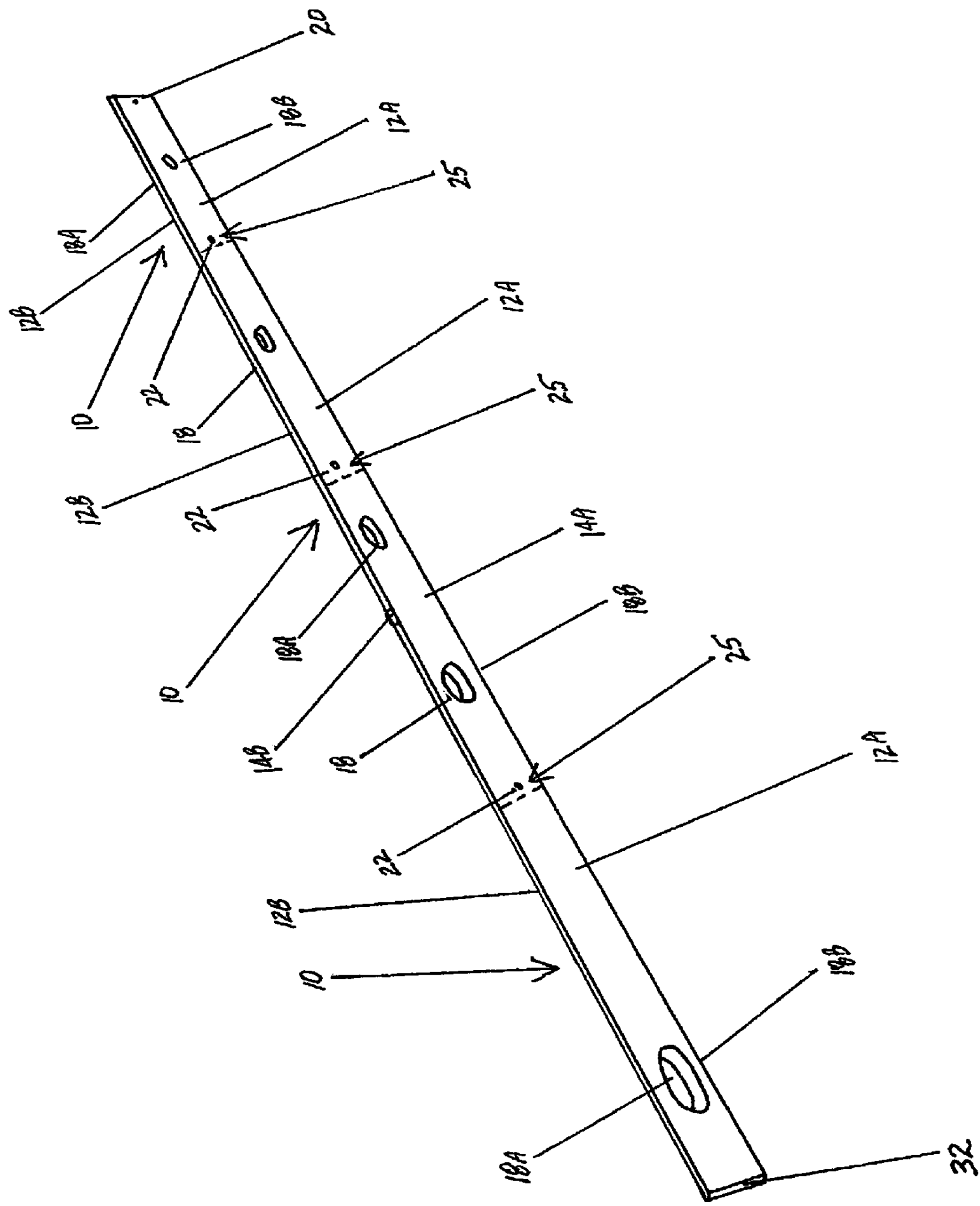
FIG. 1. Full length view of coupled sections of box levels

The drawings illustrate improved box level (10). Box level (10), similar in appearance to prior box levels, includes an elongate body (12), which is an aluminum extrusion, a pair of vials, horizontal and vertical (14*a* & 14*b*), hand-holds (18), solid aluminum directional 2-way adaptor (20), with locking mechanisms (25) Located in each section of the box level.

Elongate body (12) includes first and second face-forming walls (12*a*) and (12*b*), respectively. Hand-holds (18) extend between first and second face-forming walls (12*a*) and (12*b*) and are configured for firm engagement with each of such wall. As shown in FIG. 1, each hand-hold (18*a*) is an integral (unitary) member with outwardly projecting flanges formed to facilitate engagement with walls (12*a*) and (12*b*) of elongate body (12). Each hand-hold (18) has first and second outer edges (18*a*) and (18*b*), respectively. The first outer edges (18*a*) of the hand-holds (18) define a first work-surface application plane which is just beyond the first face plane mentioned above. Likewise, the second outer edges (18*b*) of the hand-holds (18) define a second work-surface application plane which is just beyond the second face plane mentioned above. The first and second application planes for work surfaces are parallel to one another.

Hand-holds (18) are of rubber-like material. A wide variety of suitable materials can be used, the most suitable material being one which is durable while having a rubber-like surface which resists slippage when Box Level (10) is applied to a work surface.

Figure 2:
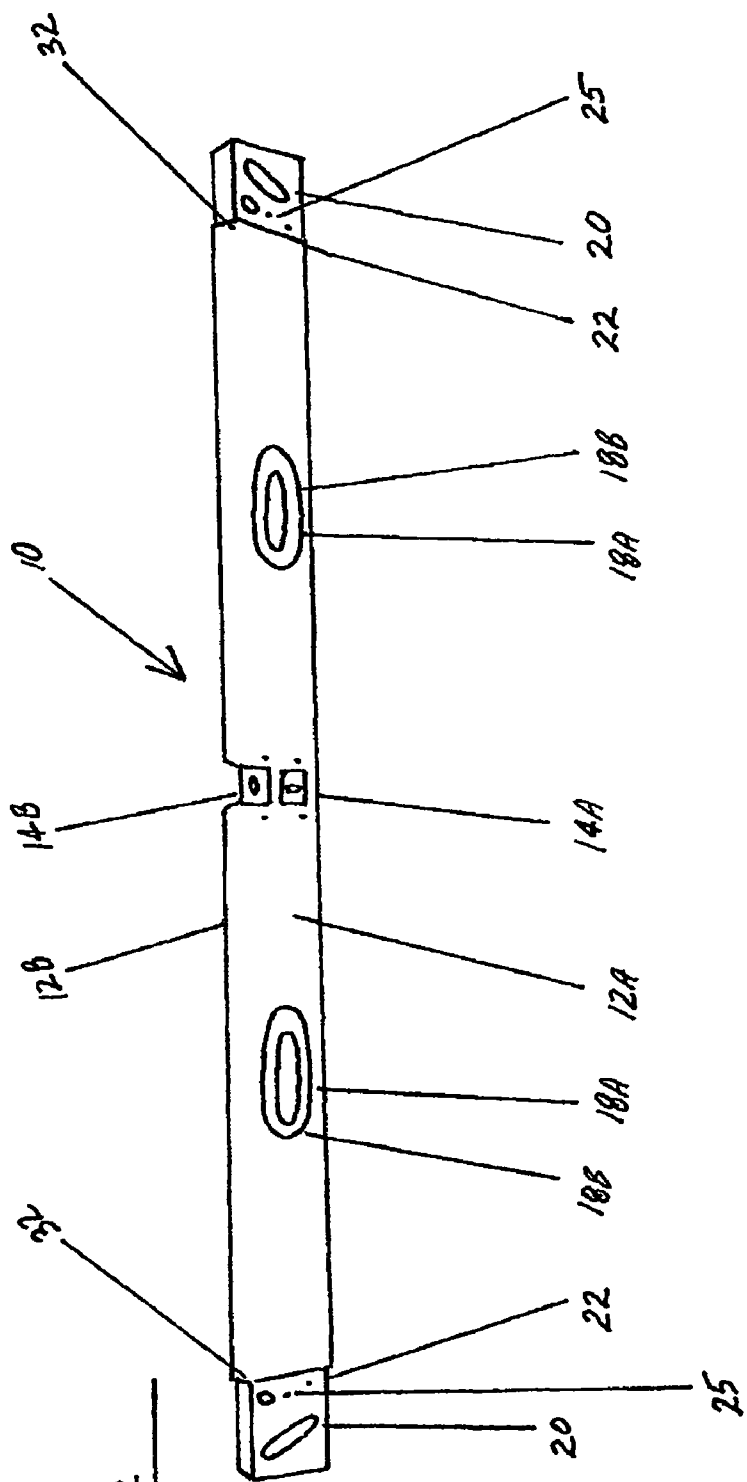
FIG. 2. Full length view of center section of box level
Figure 2A:
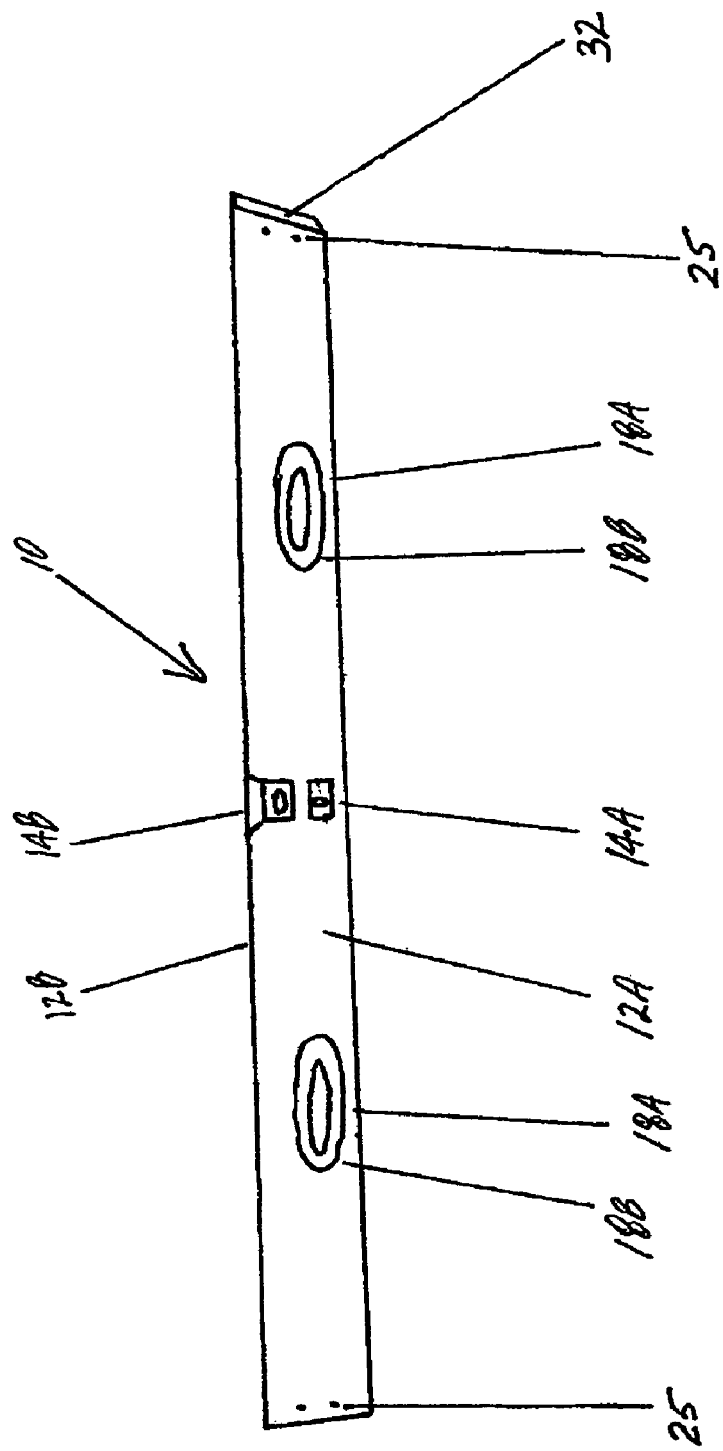
FIG. 2*a*. Close up view of box level section, with hand-holds and horizontal & vertical vials FIG. 3. Close up view of box level section, with solid aluminum directional 2-way adaptor partially inserted into open end of box level section (left side)
Figure 3:
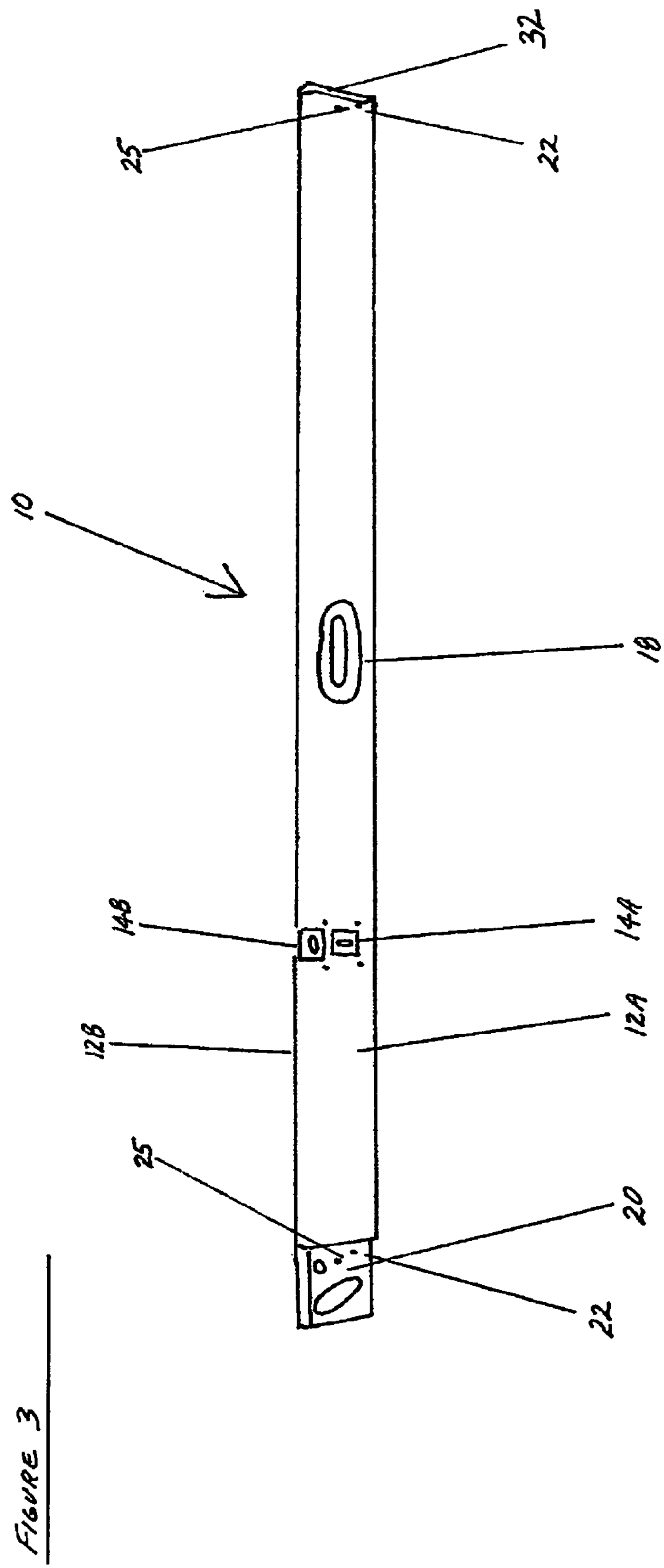

As shown in FIG. 2, the center section of Box Level (10) has two hand-holds (18) secured in each section; and as shown in FIG. 3, the box level (10) has two hand-holds (18) secured in each section. As shown in FIG. 2, the center section of Box Level (10) has two hand-holds (18) secured in each section; a pair of vials, horizontal and vertical (14*a* & 14*b*); two solid aluminum directional 2-way adaptors (20) secured on each end of the Box Level (10); each solid aluminum directional 2-way adaptor (20) has Two ¼ inch holes (22) drilled through body to accept locking mechanism (25) such as locking pins (30) as shown in FIG. 8; elongate body (12) includes first and second face-forming walls (12*a*) and (12*b*) respectively.

As shown in FIG. 1, the drawing shows one center section of Box Level (10) and three coupled sections of Box Levels (10). This drawing depicts approximately 20 lineal feet of coupled sections of improved Box Level (10), and additional sections can be coupled for whatever length desired.

Figure 8:
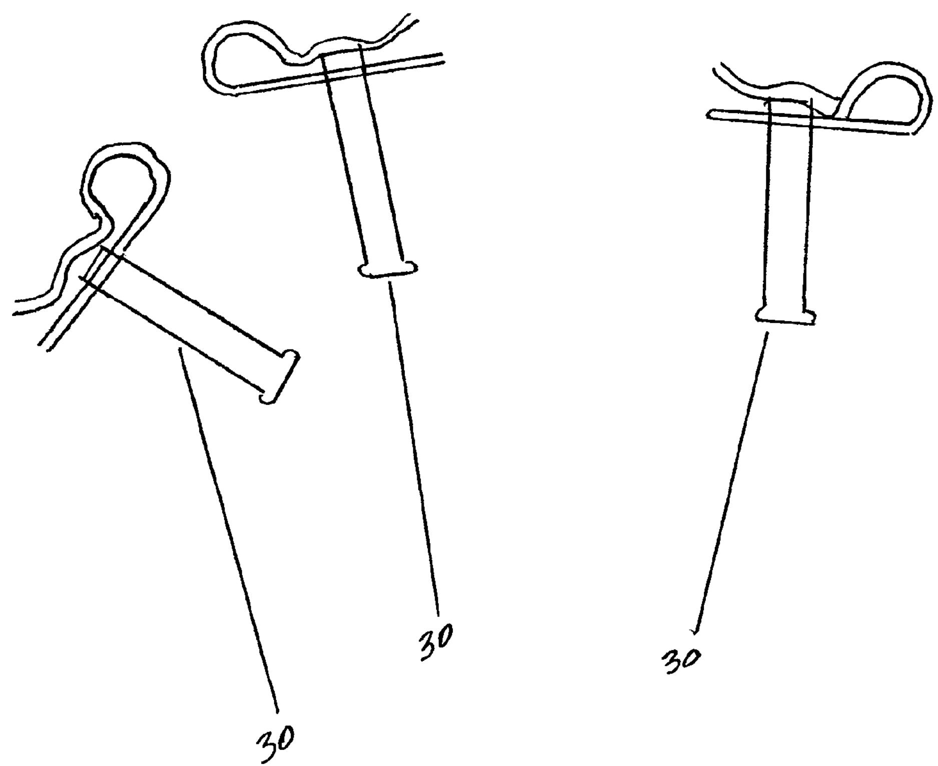

As shown in FIG. 3, the section of Box Level (10) has one hand-hold (18) secured in each section; a pair of vials, horizontal and vertical (14*a* & 14*b*); one solid aluminum directional 2-way adaptor (20) secured on one end (either side, left or right); each solid aluminum directional 2-way adaptor (20) has two ¼ inch holes (22) drilled through body to accept locking mechanism (25) such as locking pins (30) as shown in FIG. 8; elongate body (12) includes first and second face-forming walls (12*a*) and (12*b*) respectively.

Figure 4:
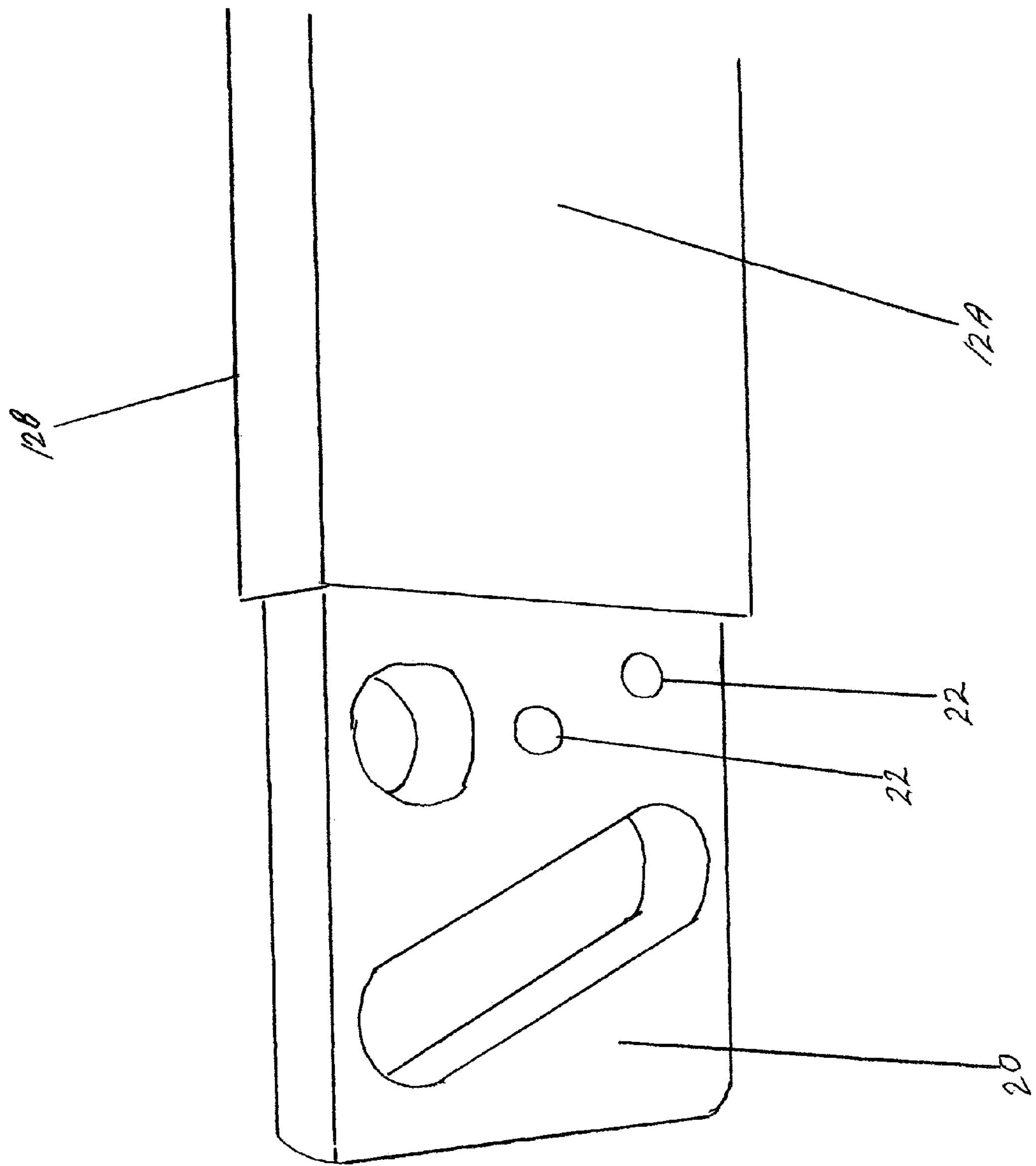
FIG. 4. Close up view of box level section with solid aluminum directional 2-way adaptor partially inserted into open end of box level sections FIG. 5. Close up view of horizontal and vertical vials located on each section of box level FIG. 6. Close up view of open end of box level FIG. 7. Close up view of the permanent, welded 90 degree angle directional 4-way adaptor FIG. 7*a*. This is a close up view of the permanent, welded 90 degree angle directional 4-way adaptor partially inserted into the open ends of two box level sections, this view shows how they are coupled FIG. 7*b*. This is a close up view of the solid aluminum directional 2-way adaptor FIG. 8. Close up view of locking mechanism such as locking mechanism pins.
Figure 6:
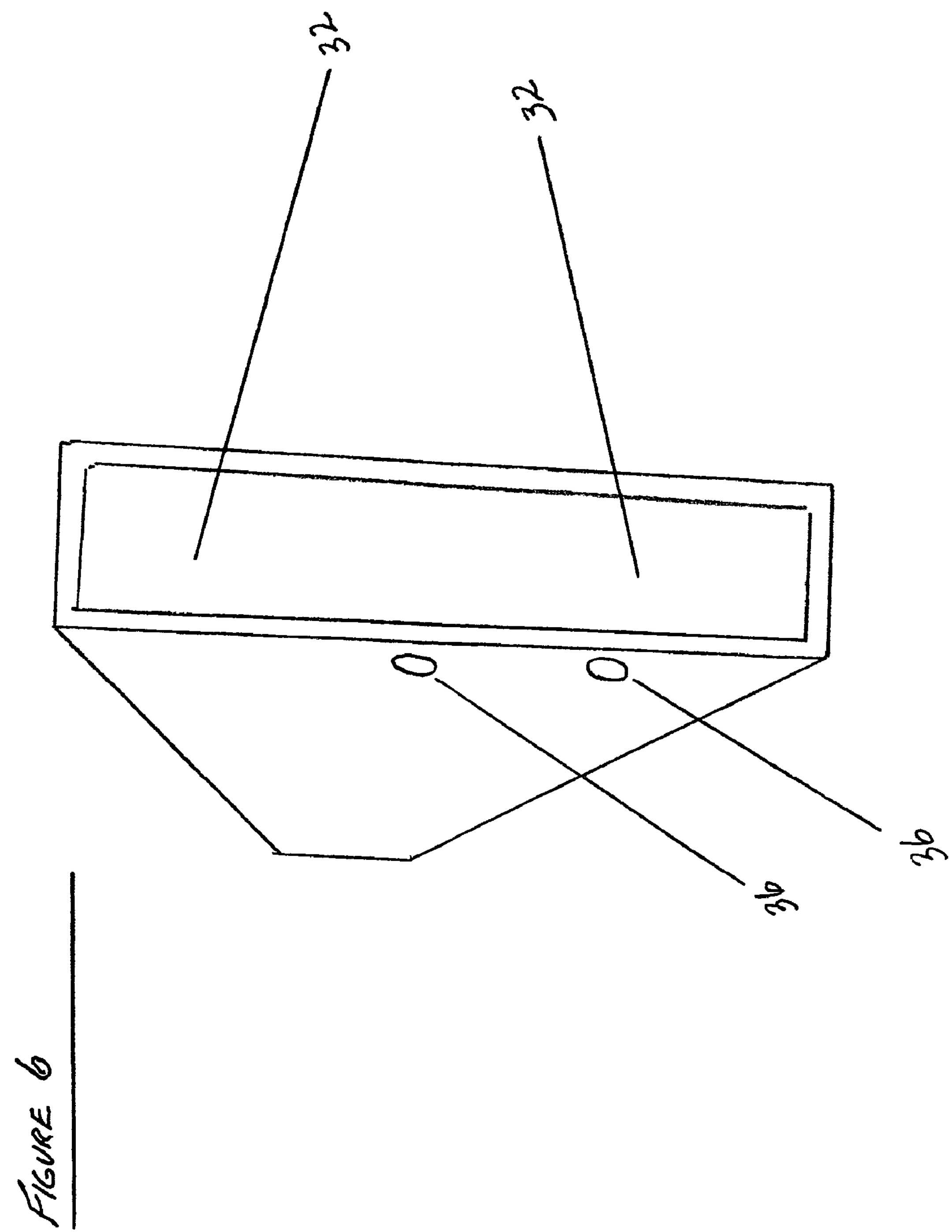

As shown in FIG. 4, this is a close-up view of the solid aluminum directional 2-way adaptor (20) secured to one end of the Box Level (10); each solid aluminum directional 2-way adaptor (20) has two ¼ inch holes 22) drilled through body to accept locking mechanism (25) such as locking pins (30) as shown in FIG. 8; when each section is coupled simply by sliding open end (32) of the Box Level (10) (as shown in FIG. 6) over solid aluminum directional 2-way adaptor (20) two pre-drilled holes ¼ inch wide (36) (as shown in FIG. 6) will line up precisely with two ¼ inch holes (22) drilled through body of solid aluminum directional 2-way adaptor (20) to accept locking mechanism (25) such as locking pins (30) such as shown in FIG. 8; once coupled and locking mechanism (25) such as locking pins (30) are inserted, individual sections of Box Level (10) will not pull apart, not only for safety concerns but allows movement of several sections without separation of units.

Figure 5:
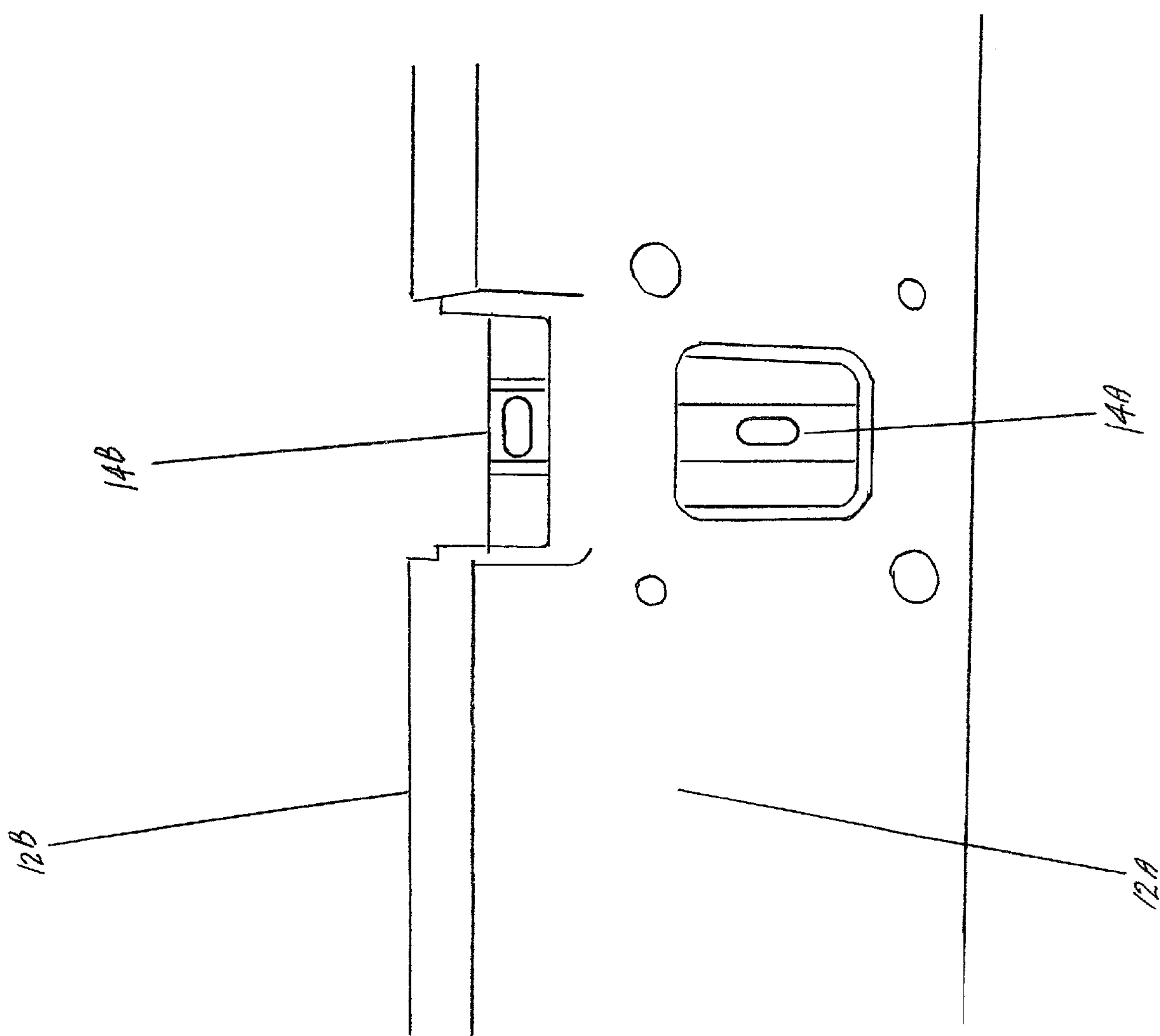

As shown in FIG. 5, this is a close-up view of a pair of vials, horizontal and vertical (14*a* & 14*b*); the drawing defining vial openings and vials secured in the vial openings.

Figure 7:
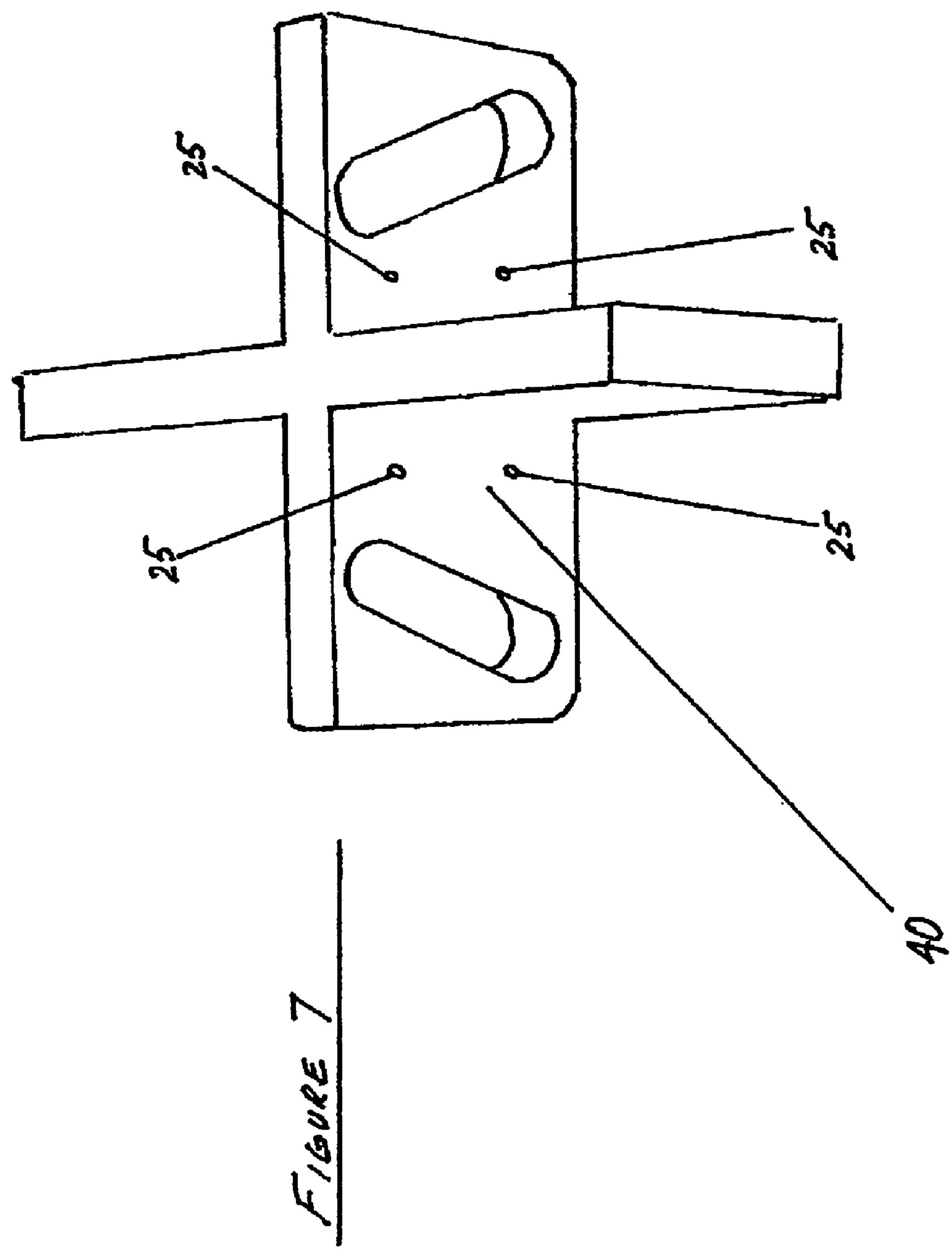

As shown in FIG. 7, this is a close-up view of the permanent, welded 90 degree angle directional 4-way adaptor (40) that when coupled to various sections of Box Level (10), will extend the instrument in 90 degree angles, East, West, North, South. Like the solid aluminum directional 2-way adaptor (20), it is machined to such a tolerance that when inserted into the open end of Box Level (10), it fits tight and does not wobble.

Figure 7A:
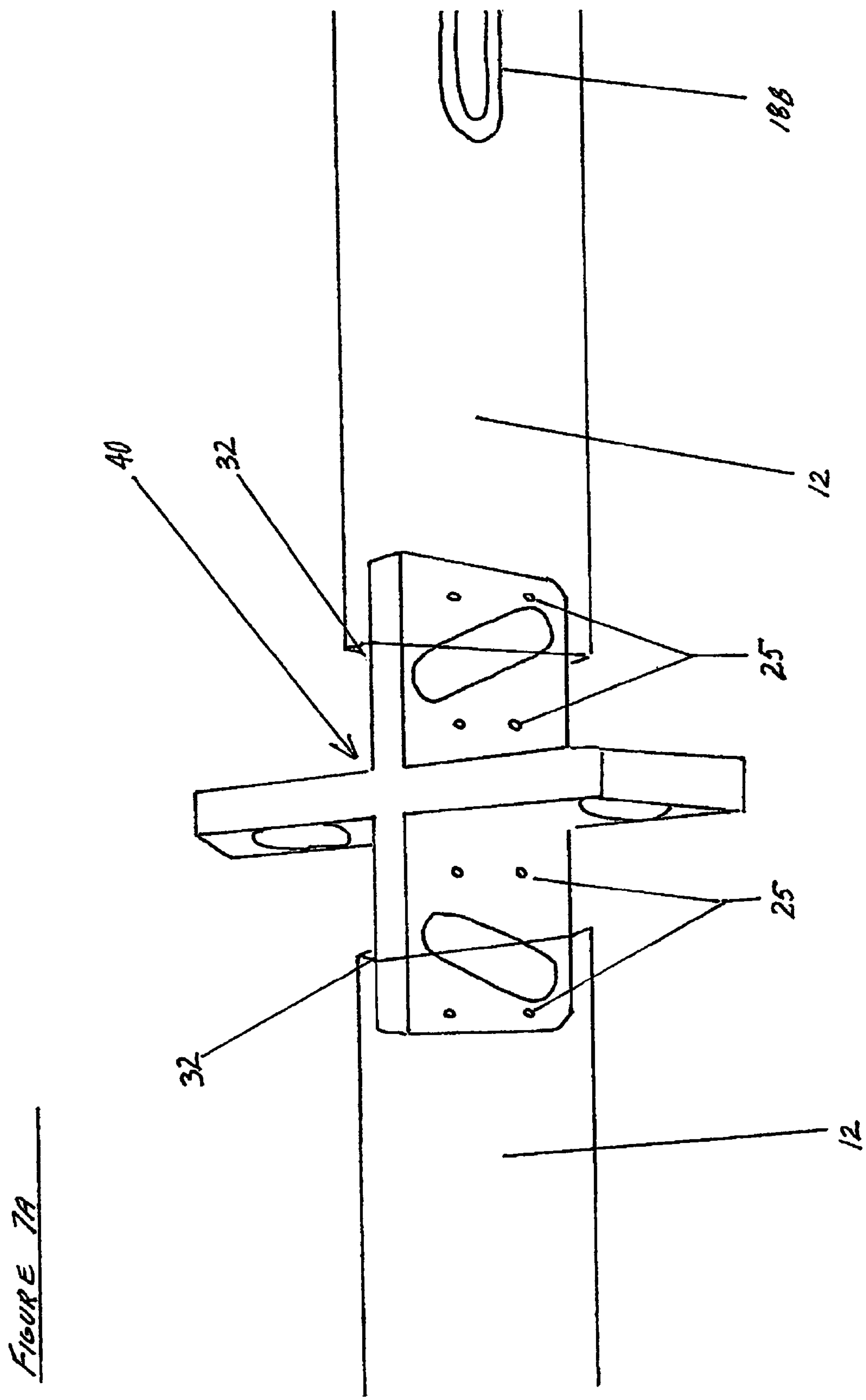
Figure 7B:
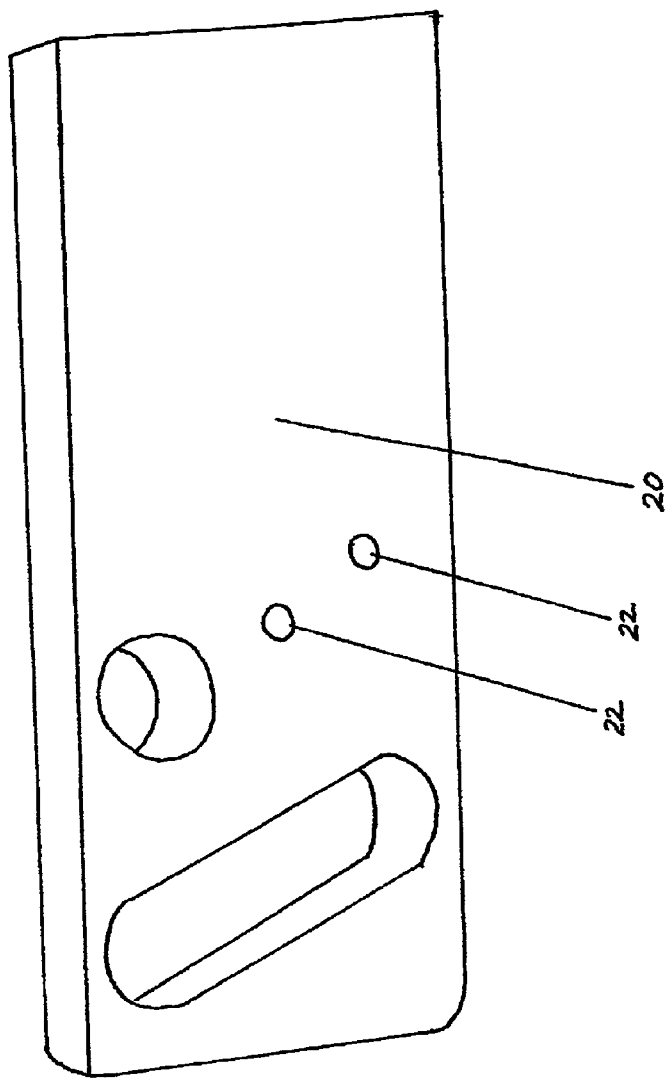

As shown in FIG. 7*a*, this is a close up view of the permanent, welded 90 degree angle directional 4-way adaptor (40) inserted partially into the open ends (32) of two box level sections (10). This view shows how they are coupled. The 4-way adaptor is solid aluminum. As shown in FIG. 7*b*, this is a close up view of the solid aluminum directional 2-way adaptor (20). Both adaptors (2-way (20) and 4-way (40)) are made of solid aluminum, machined to fit tight into the inside diameter of the open end of the box level section, and can be secured permanently in the box level section or they are designed to be removed at will. Both adaptors perform the same function, that is, to allow multiple individual box level sections to be coupled together to achieve greater length. The 2-way adaptor (20) allows coupling of two box level sections in the same direction; the 4-way adaptor (40) allows coupling of the box level sections (two or more) in four different directions, East, West, North and South, at 90 degree angles.

While the principles of this invention have been shown and described in connection with specific embodiments, it is to be understood that such embodiments are by way of example and are not limiting.

What is claimed is:

1. A box level comprising: an elongate body having a first wall and a second wall extending between opposite ends, the walls forming opposed first and second face planes and defining vial openings; various hand-hold openings at each end; horizontal and vertical vials secured in the vial openings; hand-holds secured in the hand-hold openings; the hand-holds having outer edges together defining first and second parallel application planes just beyond the first and second face planes; the hand-holds having an interior surface defining a first outer flange, a first inner flange, a second outer flange, and a second inner flange, the first outer and inner flanges forming a first channel for receiving the first wall, the second outer and inner flanges forming a second channel for receiving the second wall; each section of the box level has installed in an open end of one or both ends a removable or permanent solid aluminum directional 2-way adaptor, this adaptor can be secured permanently in the box level section or is designed to be removed at will which allows for each section of box level to be coupled to another box level section in the same direction; and when coupled, a locking mechanism prevents separation of units while being moved; furthermore, a permanent, welded 90 degree angle directional 4-way adaptor allows for the extension of each box level in 4 directions at a 90 degree angle, primarily East, West, North, South; both the 2-way and 4-way adaptors are made of solid aluminum, and each are designed to be secured in a box level section permanently or can be removed at will; furthermore, both adaptors are designed to be inserted into the open end of the box level section, and the locking mechanism prevents wobbling, drooping, or movement; the 2-way adaptor allows for the coupling of two box level sections in the same direction; to couple another box level section, another 2-way adaptor is required, similarly, the 4-way adaptor allows for the coupling of up to four box level sections in up to four different directions, East, West, North & South, at 90 degree angles; the purpose and design of the 2-way and 4-way adaptors is to permit coupling of one or more individual, separate box level sections to achieve greater length of the open ended box level.

2. The box level of claim 1 wherein the hand-holds are of rubber-like material.

3. The box level of claim 1 wherein the elongate body is an aluminum extrusion, of ⅛" inch in thickness.

4. The box level of claim 1 wherein the directional 2-way adaptor is solid aluminum.

5. The box level of claim 1 wherein each section of box level can be manufactured in various lengths, from 4 ln. ft. sections to 20 ln. ft. sections.

6. The box level of claim 1 wherein horizontal & vertical vials of various accuracy, dimension, and type are available upon special request.

7. The box level of claim 1 wherein the permanent, welded 90 degree angle directional 4-way adaptor and the directional 2-way adaptor is solid aluminum.

8. The box level of claim 1 is powder coated for easy clean-up and durability.

* * * * *